United States Patent [19]
Hill et al.

[11] Patent Number: 4,874,648
[45] Date of Patent: Oct. 17, 1989

[54] METHOD OF MAKING FLAME RESISTANT POLYIMIDE FOAM INSULATION AND THE RESULTING INSULATION

[75] Inventors: Francis V. Hill; Lola E. Crosswhite, both of San Diego, Calif.

[73] Assignee: Sorrento Engineer, Inc., National City, Calif.

[21] Appl. No.: 167,796

[22] Filed: Mar. 17, 1988

[51] Int. Cl.⁴ .......................... B32B 1/08; B32B 1/10
[52] U.S. Cl. .................................. 428/35.9; 156/188; 156/212; 156/245; 156/289; 156/307.3; 156/331.1; 156/331.5; 156/78; 264/137; 264/321; 428/36.5; 428/36.91; 428/314.2; 428/316.6
[58] Field of Search ...................... 156/78, 245, 307.3, 156/331.1, 331.5, 187, 188, 212, 289; 264/137, 321; 521/184, 185, 189, 918; 428/35.9, 36.5, 36.91, 314.2, 316.6

[56] References Cited

U.S. PATENT DOCUMENTS

| | | | |
|---|---|---|---|
| 4,439,381 | 3/1984 | Gagliani et al. | 521/185 X |
| 4,621,015 | 11/1986 | Long et al. | 521/185 X |
| 4,647,597 | 3/1987 | Shulman et al. | 521/185 |
| 4,780,167 | 10/1988 | Hill | 156/245 |

*Primary Examiner*—Robert A. Dawson
*Attorney, Agent, or Firm*—Frank D. Gilliam

[57] ABSTRACT

A method of making high efficiency, flame resistant polyimide foam insulation particularly suitable for insulating plastic pipes and forming ducts. Typically a sheet of polyimide foam which has been foamed unconstrained is placed between opposed caul plates, squeezed to a thickness less than the original thickness and heated to stabilize the new sheet thickness. Face sheets coated with a polyimide adhesive can then be placed against the stabilized foam faces and heated between plates to bond the face sheets to the foam. Also, a sheet of foam which had been impregnated with polyimide resin precursor can be placed against the stabilized sheet and the resin precursor simultaneously cured and the sheet bonded to the stabilized foam. A variety of flat, tubular or other shapes can be made by this method. The resulting insulation panels, tubes or the like have greatly improved flame resistance and excellent thermal insulation characteristics.

19 Claims, 3 Drawing Sheets

METHOD OF MAKING FLAME RESISTANT POLYIMIDE FOAM INSULATION AND THE RESULTING INSULATION

BACKGROUND OF THE INVENTION

This invention relates in general to thermal insulation materials and, more specifically, to polyimide foam insulation having improved flame resistance.

Thermal insulation for pipes, ducts and the like is often made from foamed materials which have excellent resistance to heat flow. A wide variety of foamed plastics have been used for different applications. Typical of these are the polystyrene foam panels described by Charpentier in U.S. Pat. No. 3,863,908 phenolic foam panels described by Burning et al. in U.S. Pat. No. 3,885,010, and the polyurethane foam panels described by Willy in U.S. Pat. No. 3,298,884. However, many of these materials are flammable and give off toxic gases when exposed to flames. These materials are not acceptable for use in aircraft, ships, spacecraft, etc.

Polyimide foams have been found to be excellent insulating materials and to be flame resistant. Polyimides also do not emit toxic gases when exposed to direct flames. Polyimide foams are ordinarily produced in closed molds where specific thicknesses and surface configurations are required. Typical of such methods are those disclosed by Long et al. in U.S. Pat. No. 4,621,015 and Shulman et al. in U.S. Pat. No. 4,647,487.

Foam produced in closed molds tends to be very irregular, lacking uniformity of cell size, density and strength across the mold. Often, the gases emitted by the polyimide precursor during foaming inhibit the growth of cells in the foam, making foaming action low and unpredictable. These problems increase when attempts are made to vary the foam product density by varying the amount of precursor placed in the mold. In some cases, polyimide precursors are foamed at ambient pressure in open molds. The resulting foam block is then sliced parallel to the mold bottom to produce sheets and eliminate the rind that forms on the foam surface. While this produces more uniform cell size and density, it is very difficult to produce foams of selected different densities.

Recently, considerable interest has developed in using plastic pipe for its improved corrosion resistance and light weight, especially in U.S. Navy ships. Often, such pipes are made from fiberglass reinforced epoxy resins. Typical pipes are offered by the Ameron Corporation under the Bondstrand trademark. Since these pipes lack the heat and flame resistance of metal pipes, it is essential that maximum possible flame resistance be provided through insulation.

One standard requires that such insulated pipes withstand a flame temperature of 1600° F. for a period of 15 minutes and must limit the temperature of the plastic pipe to no greater than 300° F. Insulation is tested by placing the insulated pipe in a test cell with hexane fuel floated on water below the pipe. The hexane is ignited and luminous flames heat the test article above.

Most plastic foam insulation rapidly fails during that test, often giving off toxic gases and actually igniting. Some inorganic insulation materials can pass that test. However, those materials tend to be very heavy and difficult to install and often containing undesirable ingredients such as asbestos. While polyimide foams do not emit toxic gases and have good flame resistance, prior polyimide foams scorch badly and have seriously degraded surfaces when subjected to the above test. Also, prior flame resistant foams did not have sufficient rigidity to permit use as unsupported ducts or the like.

Therefore, there is a continuing need for improved polyimide foam insulation having improved flame resistance and which can be conveniently formed into pipe and duct insulation having selected variable physical characteristics.

SUMMARY OF THE INVENTION

The above-noted problems, and others, are overcome by the method of this invention which basically comprises the steps of making or otherwise providing a substantially uniform sheet of polyimide foam which was foamed unconstrained, pressing the sheet between caulk plates to a thickness of form about 10 to 90% of the original thickness and heating the sheet to a temperature of from about 450° to 600° F. for a suitable period to produce a stabilized sheet which retains the new thickness when cooled.

The resulting sheet has an increase in density inversely proportional to the reduction in thickness. The sheet is very uniform in density, cell size and other physical characteristics. We have found that the increase in density also produces a corresponding increase in flame resistance, to the point that when the foam is tested as described above, the prolonged exposure to flames does not result in significant foam degradation. Also, the response to the flame test is very uniform and constant across the sheet, which could not be obtained with high density foam formed in a closed cell because of the inherent non-uniformity of foam produced by that method, as detailed above.

In one preferred embodiment, one or two face sheets are coated or impregnated with a polyimide resin precursor, then are placed against one or both faces of the stabilized sheet, the resulting assembly is placed between caul plates to assure intimate contact and the assembly is heated to a temperature between about 400° and 625° F. for a period sufficient to cure the resin. The optimum temperature and heating period will vary somewhat depending upon the resin selected. If desired, a small portion of the compression of the foam sheet can be accomplished during this bonding step.

In another preferred embodiment, a sheet of open cell polyimide foam which has been impregnated with a liquid polyimide precursor which has been dried but not cured (as described in detail in copending U.S. Patent application Ser. No. 111,851, filed Oct. 23, 1987 by Francis U. Hill, which is now U.S. Pat. No. 4,780,167) may be laid over a sheet of stabilized foam produced as described above, the resulting assembly (with face sheets, if desired) is placed between caul plates and heated from about 400° to 625° F. for a suitable time to completely cure the resin foam impregnate and bond the two foam sheets (and any face sheets) together. This produces a very rigid structure due to the impregnated foam sheet having a very flame resistant surface due to the stabilized foam sheet.

Besides the manufacture of flat panels as described above, various tubular configurations can also be produced, typically for use as pipe insulation or self-supporting ducts. One method comprises stabilizing a sheet of polyimide foam at a desired thickness and density, wrapping the sheet at least once around a mandrel, covering the foam with an outer mold surface and heating the assembly at about 400° to 650° F. for a suitable time. Generally, heating for from about 10 to 20 minutes produces excellent stabilization. If desired, face sheets can be applied to the foam tube in the manner described above. While in some cases the resulting insulating tube can be slipped over a pipe axially, ordinarily the tube will be split into two half tubes for installation. The insulation can be held to a pipe by any conventional method, such as clamps, tape, and adhesive or the like.

Large tubular, self supporting ducts can also be made. Here, at least one layer of polyimide precursor impregnated open cell polyimide foam is wrapped around a mandrel, then at least one layer of stabilized foam is wrapped thereover, followed by a face sheet if desired. An outer tubular mold encloses the resulting assembly, which is then heated to a temperature of from about 400° to 650° F. for a period sufficient to cure the resin. The resulting duct is self supporting due to the rigid inner foam layer and has outstanding flame resistance due to the stabilized outer foam layer.

Other more complex shapes can be made in a similar manner, selecting mold configurations and foam sheets as appropriate.

BRIEF DESCRIPTION OF THE DRAWING

Details of the invention, and of certain preferred embodiments thereof, will be further understood upon reference to the drawing, wherein.

DETAILED DESCRIPTION OF THE INVENTION

Figure 1:
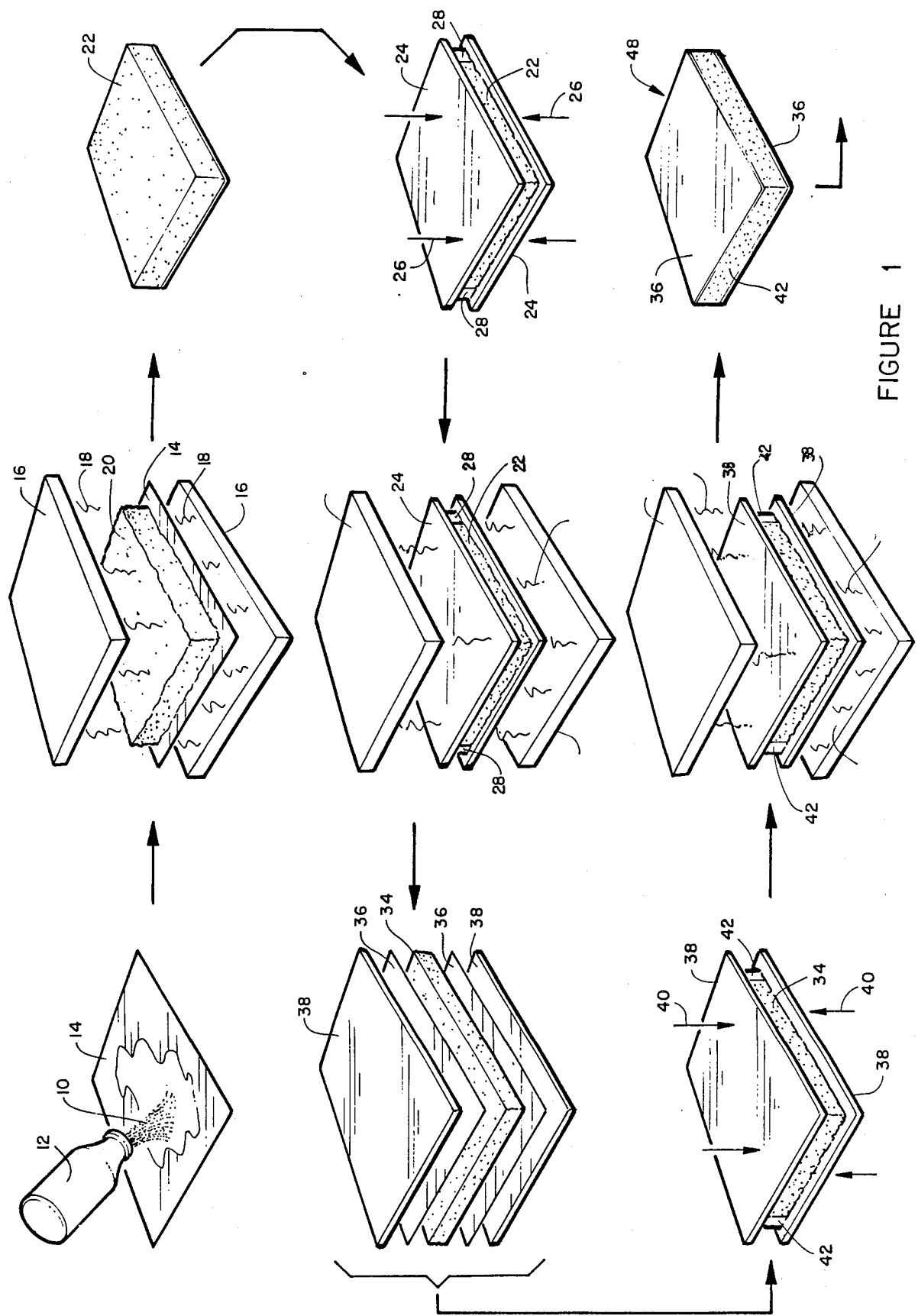
FIG. 1 is a schematic flow diagram illustrating the method of making stabilized foam panels with face sheets.

Referring now to FIG. 1, there is seen a schematic flow diagram detailing the steps in one preferred embodiment of our invention. In this embodiment, a flat insulation panel having two face sheets is produced.

In the first step, a polyimide precursor powder 10 is poured from a container 12 onto a non-stick sheet 14. The powder should be spread reasonably evenly, although precise powder layer thickness control is not necessary.

Any suitable polyimide precursor may be used. Typical foamable polyimide precursors which will spontaneously foam when heated are described by Gagliani et al. in U.S. Pat. Nos. 4,426,463 and 4,439,381 and by Shulman et al. in U.S. Pat. No. 4,647,597. While suitable aliphatic polyimide precursors may be used, aromatic polyimides are generally preferred for their usual greater flame resistance. The precursor powder described in Examples I, VI and VII of U.S. Pat. No. 3,554,939 (Levin et al.) is particularly useful in the method of our invention. This material produces a foam having superior hydrolytic stability and steam resistance when formed into insulation by our techniques.

The polyimide precursor powder may incorporate any suitable additives, such as surfactants to improve cell structure uniformity, blowing agents, fillers or other additives as desired. Typical surfactants include FSN and Zonyl from E.I. duPont de Nemours & Co., L550 from Union Carbide Corporation, 190 and 193 from Dow Corning Corporation and FC430 from Minnesota Mining and Manufacturing Co. Typical fillers include glass or phenolic microballoons, fibers such as glass, graphite, Kevlar aramid, ceramics and flourocarbon powders and the like.

Sheet 14 may be any suitable flat surface material which will not stick to the foam may be used. Typical materials include mold-release coated metals and ceramics and Teflon fluorocarbon coated glass cloth. The cloth is preferred for simplicity and convenience.

In the second step, powder 10 on sheet 14 is placed in an oven and heated, as schematically indicated by heating panels 16 directing heat 18 toward powder 10, to the proper foaming temperature for the polyimide precursor selected Generally, the powder is heated to a temperature in the 400° to 650° F. for from about 60 to 90 minutes. The optimum temperature and time will depend upon the polyimide resin precursor powder selected. Any suitable oven or other heating means may be used. For best results, we prefer a circulating hot air oven or microwave heating.

Upon completion of the heating step, the powder has expanded into a foam body having uniform cell size and structure and uniform, low density due to the unconstrained foaming. The exterior of the foam body is irregular and generally has a skin or rind over the exterior surface. Therefore, the next step is to trim the foam to the size and dimensions desired, as shown by foam sheet 22. The foam is generally trimmed with a suitable knife or saw, and may be sliced into one thick sheet or a number of thin sheets as desired.

While the method of producing foam sheets 22 described above is preferred, the foam sheets for the balance of this sequence of steps can be provided by any other method which uses unconstrained foaming to produce foams having uniform density, cell size and other physical characteristics along with low density. For example, the foams may be expanded from a liquid precursor or by an added blowing agent, rather than through spontaneous generation of the blowing gas. A number of polyimide foams using blowing agents are described by Gagliani et al. in U.S. Pat. No. 4,506,038.

The next step in this preferred method is compression of the foam sheet under conditions which produce a stabilized foam sheet having increased density, greater flame resistance and uniform physical properties. The foam sheet 22 is compressed between a pair of caul plates 24 as schematically indicated by arrows 26 to a thickness from about 10 to 90% of the original thickness. Density increase in the foam sheet is inversely proportional to the degree of compression. Generally, the density of the foam is increased from about 0.6 lb/ft$^3$ to from about 2.0 to 3.0 lb/ft3. Any suitable caul plates may be used. Typically aluminum plates having a mold release coating, such as Depco 2030 from Aircraft Products, Inc. Small spacers 28 are inserted at the corners between caul plates 24 to limit compression to the desired degree.

The assembly of caul plates 24, compressed foam sheet 22 and corner spacers 28 is then placed in an oven having heat sources schematically indicated by plates 30 emitting heat indicated by arrows 32. In order to stabilize foam sheet 22 in the compressed configuration, the sheet is heated to a temperature of from about 400° to 650° F. for a suitable period, with the precise optimum temperature and time determined by the specific polyimide used. Upon removal from the oven and caul plates, the foam sheet is found to be stable in the new thickness and to be highly uniform in all physical properties.

The stabilized foam sheet 34 can at this time be used for flame resistant thermal insulation applications. When tested against uncompressed, unstabilized foam by the flame test described above, the stabilized higher density foam is found to resist flames for a much greater time without degradation, easily passing the 15 minutes at 1600° F. test. The thermal insulating properties of the foam are not appreciably reduced by the compression and stabilization.

In many cases, it may be desirable to add face sheets to the stabilized foam for surface protection, handling or other reasons. Therefore, the preferred method of FIG. 1 continues with the addition of such face sheets.

One or two suitable face sheets 36 are coated or impregnated with a suitable polyimide adhesive and placed on one or both sides of stabilized foam sheet 34 and the resulting sandwich is placed between a pair of mold-release coated caul plates 38 which may be generally similar to caul plates 24 described above.

Any suitable face sheet material may be used. Typical face sheet materials include fibrous materials in cloth, matt or blanket form, using fibers such as glass, metals, ceramics and mixtures and combinations thereof. Flame resistant materials in other forms, such as metal mesh or glass fiber netting could be used, if desired. We have found that optimum performance is obtained with fiberglass cloth face sheets. While any suitable adhesive which does not degrade the flame resistance of the assembly may be used, polyimide adhesives are preferred for flame resistance and compatibility with the foam. Typically, a dry powder polyimide precursor (of the non-foaming type) is mixed with a suitable solvent, such as ethyl alcohol to a varnish-like consistency and lightly brushed on the face sheet material, or foaming-type liquid polyimide precursors may be applied this same way.

The sandwich of stabilized foam sheet 34 and face sheets 36 is compressed sufficiently to press the face sheets tightly against the foam as schematically indicated by arrows 40. Corner spacer blocks 42 limit compression to the desired degree. If desired, a portion of the compression of stabilized foam 34 could be accomplished at this time. For example, to make a curved part, about 70 to 95% of the desired compression could be accomplished in the foam compression step detailed above, with the remaining 5 to 30% of the compression accomplished in conjunction with the face sheet application step. This intermediate compression step may be omitted for simple parts, such as flat plates, and the full compression with addition of the face sheets may be accomplished in a single step. The face sheets should not be applied at the first compression step in the event of a curved (not flat) product because the compressed foam in the flat configuration is more easily bent and inserted into a complex mold. The remaining compression insures adherence of the face sheets in the complex mold.

The assembly is then placed in an oven indicated by plates 44 and heated as indicated by arrows 46 to a temperature of from about 400° to 650° F. for a period sufficient to cure the polyimide adhesive and bond the assembly together.

The insulation manufacturing process is complete when the final insulation panel 48 is removed from the oven. The panel may then be installed on surfaces to be thermally insulated with the added advantage of outstanding protection against fames.

Figure 2:
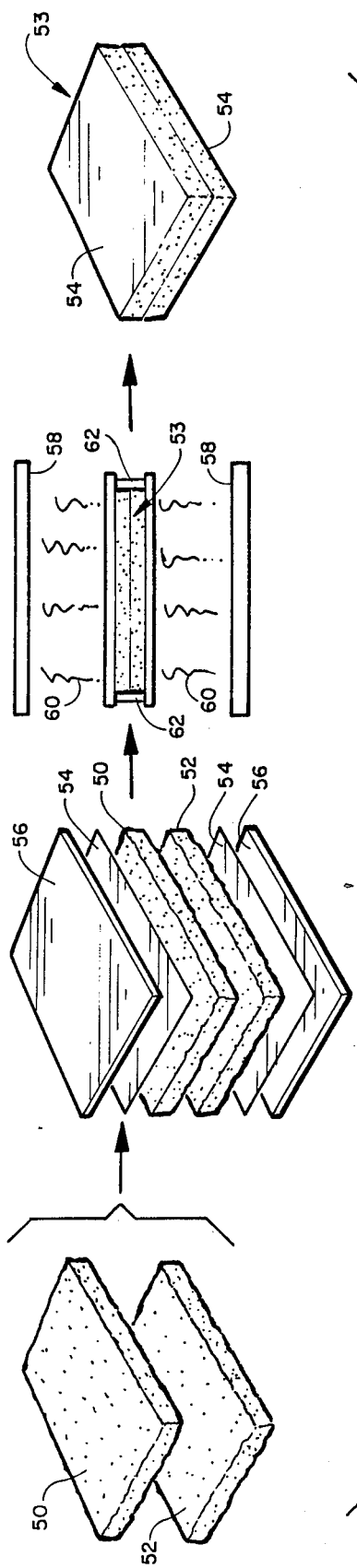
FIG. 2 is a schematic flow diagram illustrating an embodiment combining rigid and stabilized foam sheets.

Another embodiment of our manufacturing method is schematically illustrated in FIG. 2.

A sheet of stabilized polyimide foam 50 is prepared according to the first five steps shown in FIG. 1.

A sheet of uncured rigid foam sheet 52 is prepared according to the disclosure of copending U.S. patent application Ser. No. 111,851, filed Oct. 23, 1987 in the name of Francis U. Hill. Briefly, uncured sheet 52 is prepared by immersing a sheet of open cell polyimide foam in a bath comprising a solution of a polyimide coating precursor in a solvent, such as an alcohol, then passing the sheet between closely spaced rollers to squeeze out all but a selected quantity of the solution. The resulting uncured sheet has a precisely selected amount of uncured resin uniformly coating all interstices. Upon heating, the coating cures, producing a rigid foam sheet. For the purposes of this invention, the foam is used in the uncured state.

The next step is to assemble a pack 53 of the stabilized foam sheet 50, the uncured rigid sheet 52 and two face sheets 54 (if face sheets are desired), then place the pack between opposed caul plates 56, which have been coated with a mold release. The face sheet in contact with stabilized foam sheet 50 is coated or impregnated with a liquid polyimide resin precursor as described above.

Pack 53 is then heated in an oven schematically indicated by plates 58, with heat directed toward the pack as indicated by arrows 60. Corner blocks 62 determine the precise spacing of caul plates 58. Generally, the pack is compressed slightly to assure good surface contact between contiguous components. Typically the pack is heated at a temperature of from about 400° to 650° F. for a period sufficient to cure the uncured resins. The precise time and temperature is selected in accordance with the liquid coating applied to uncured rigid foam sheet 52. During cure, the coating resin cures, rigidizing sheet 52 and bonding sheet 52 to stabilized foam sheet 50. The face sheets 54 in contact with the foam sheets are bonded thereto, the face sheet in contact with sheet 50 being bonded by the face sheet coating and the face sheet in contact with sheet 52 being bonded by the liquid resin precursor which impregnates that sheet.

The resulting well bonded pack 53 is very rigid and sturdy, due to the cured rigid foam sheet 52 and has excellent flame resistance due to stabilized sheet 50 which would be arranged on the side from which flames would be anticipated. This panel would provide excellent protection when bonded to the exterior of electronic equipment housings, or the like. Such housings are ordinarily made from aluminum, which melts below about 1400° F. A thin pack 53 (or the product of the FIG. 1 method) bonded to the exterior walls of such housings would protect against direct flames and the heavy aluminum walls would carry away heat passing through the insulation for an extended period without melting or other physical damage to the walls.

Figure 3:
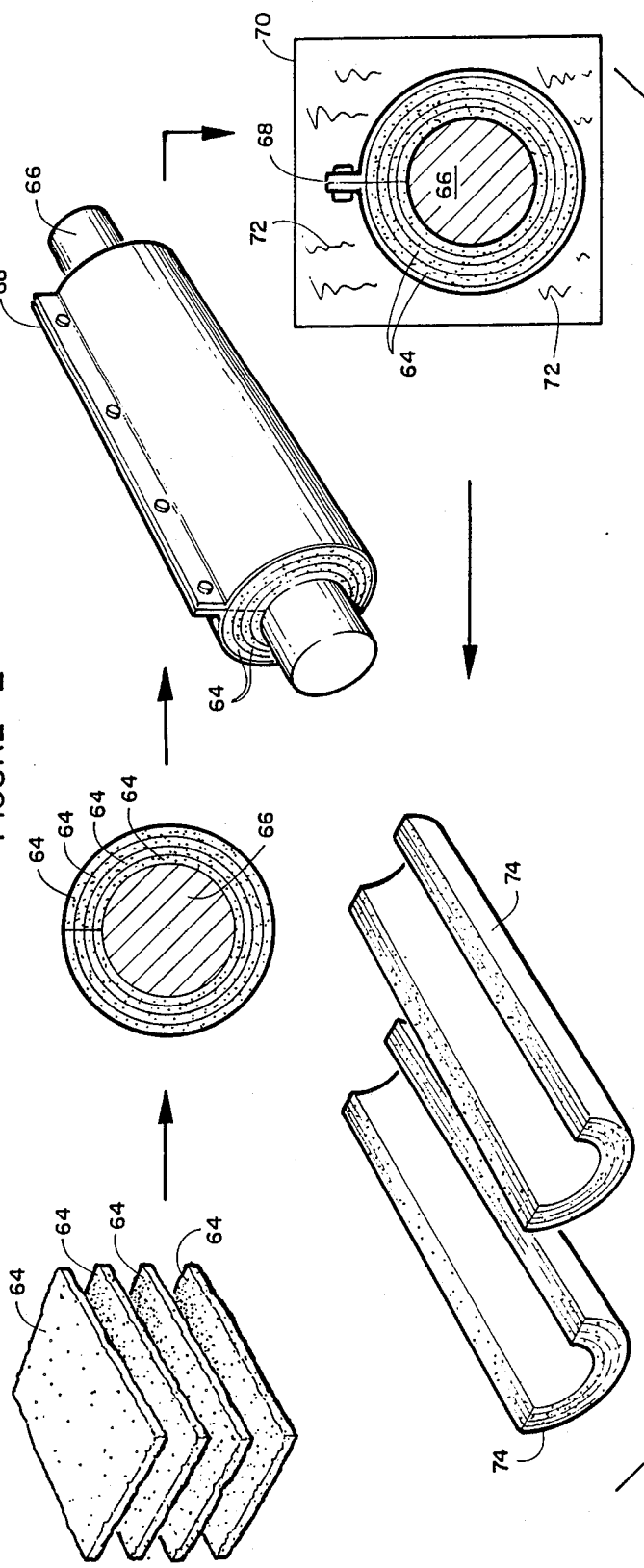
FIG. 3 is a schematic flow diagram illustrating a method of making tubes.

FIG. 3 schematically illustrates a method for making insulation for pipes. The embodiment of FIG. 3 begins with a number of thin sheets 64 of stabilized foam as is produced at the fifth step of the FIG. 1 method. Typically, these sheets 64 have thicknesses in the ⅛ to ½ inch range. Several sheets 64 are trimmed to fit and wrapped around a tubular mandrel 66 having a diameter equal to the diameter of the pipe to be insulated. Typically, four ¼ inch sheets may be used to produce 1 inch of final insulation. An external tool 68, typically a sheet metal cover, is placed around the foam and the assembly is placed in an oven 70 and heated as indicated by arrows 72.

The assembly is heated at a temperature of from about 400° to 650° F. for a time sufficient to stabilize the foam in the new configuration. Upon removal from oven 70, the resulting stabilized tube 74 can be sliced in half axially to permit easy installation on pipes. In some cases, it may be preferable to slice only one side and install the insulation by forcing the opening over a pipe. The insulation may be installed using any conventional adhesive or clamps approved for the particular application. The joint between two halves of the insulation tube should be oriented away from the anticipated flame direction for maximum protection.

Face sheets could be added to either or both tube surfaces at the foam wrap step, if desired.

Figure 4:
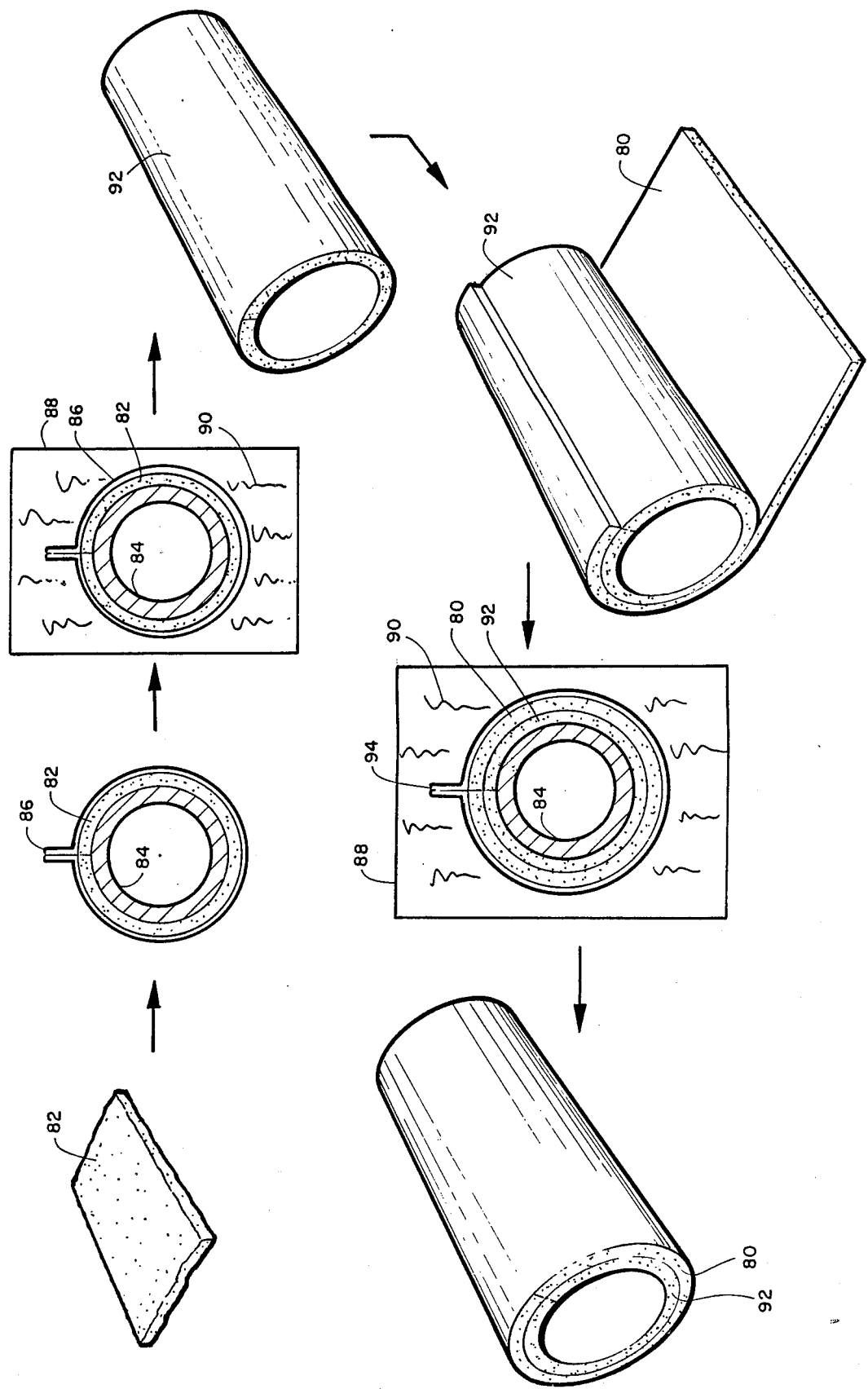
FIG. 4 is a schematic flow diagram illustrating a method of making self-supporting ducts.

Another embodiment of our method is schematically illustrated in FIG. 4. Here, a self-supporting, strong and flame resistant duct is made. As in the embodiment illustrated in FIG. 2, the duct combines stabilized foam sheet 80 as made at the fifth step in the method of FIG. 1 with an uncured rigid foam sheet 82 made in accordance with copending U.S. patent application Ser. No. 111,851.

The method of FIG. 4 begins with the preparation of a resin impregnated, uncured polyimide foam sheet in accordance with the mentioned patent application. The sheet is trimmed as necessary and wrapped around an internal tubular mandrel 84 which is then covered with a corresponding external tool 86. The mold surfaces are coated or covered with a suitable mold release material. The assembly is placed in an oven 88 and heated as indicated by arrows 90. The assembly is heated to a temperature of from about 400° to 650° F. for a period sufficient to cure the resin, with the precise time and temperature depending upon the specific liquid resin used to impregnate foam sheet 82. The result is a rigid foam tube 92. Of course, tube 92 and the resulting duct could have a cross-section other than round, if desired.

A light coating of a polyimide coating precursor is mixed with a solvent and applied over rigid tube 92. Then stabilized foam sheet 80 is trimmed to fit and wrapped around rigid tube 92. The internal mandrel 84 is reinstalled and external tooling 94 having an appropriately greater diameter to accommodate the sheet of stabilized foam is installed. This assembly is then returned to oven 88 and again heated to the curing temperature of the polyimide coating precursor. The assembly is removed from oven 88 and the now complete duct 96 is removed from the tooling. The duct is found to be rigid but not brittle, with some flexibility. When deformed slightly, it returns to the original shape. The outer layer of stabilized foam adds superior flame resistance and protects the inner tube 92 against flame.

EXAMPLES

The following examples provide certain specific preferred embodiments of the method of our invention. All parts and percentages are by weight unless otherwise indicated.

EXAMPLE I

About 200 g. of Monsanto 2601 Skybond polyimide prepolymer is sprinkled on glass fiber cloth which had been impregnated with Teflon flourocarbon resin. The cloth and powder is inserted into a circulating hot air oven which is preheated to a temperature of about 500° F. After about 45 minutes the cloth is removed from the oven and cooled to room temperature. The powder foams into a thick layer. The foam is then trimmed to the desired dimensions. All surface effects, such as rinds or other surface region discontinuities, caused by the heating are removed. The resulting foam sheet has very uniform low density, on the order of slightly less than 1 lb/ft3. The foam sheet has a thickness of about 1 inch. This sheet is then placed between aluminum caul plates which had been sprayed with Depco 2030 mold release, available from Aircraft Products Co. The sheet is compressed to a thickness of about ¼ inch, which requires very little pressure. Spacer blocks are placed in the corners of the caul plates to assure precise thickness. This assembly is then placed in the oven at a temperature of about 500° F. for about 20 minutes. The assembly is removed from the mold and cooled to room temperature. The foam sheet is found to be stabilized at the new thickness, having higher uniform density and to be self-supporting, very flexible but shape retaining. This foam is found is found to have greatly improved flame resistance, particularly in resisting flame over an extended period, when compared to the original unstabilized, lower density foam.

EXAMPLE II

A sheet of low density foam having a thickness of about 1 inch is prepared and stabilized to a thickness of about ¼ inch as described in Example I. A mixture of powder Skybond 2601 and ethyl alcohol is prepared having a consistency similar to that of conventional varnish. Two sheets of glass fiber cloth are each painted sparingly on one side with the mixture. The cloth sheets are first dried in a warm oven at 150° F. for 10 minutes and are then placed against the two sides of the stabilized sheets with the coated sides in contact with the foam. The sandwich is placed between two mold release coated aluminum caul plates with spacers at the corners which allow only slight compression of the sandwich. This assembly is then placed in a circulating hot air oven at a temperature of about 500° F. for about 90 minutes. The assembly is then removed from the oven and cooled to room temperature. The resulting panel is found to be very sturdy, with surfaces well protected against impact damage and to have excellent flame resistance.

EXAMPLE III

A sheet of uncured dried resin impregnated polyimide foam is prepared as described in the first two paragraphs of Example I of copending U.S. patent application Ser. No. 111,851, filed Oct. 23, 1987. This sheet has a thickness of about 0.5 inch.

A sheet of stabilized polyimide foam is prepared as described in Example I of this application. The sheet has a thickness of about ⅛ inch.

The uncured sheet and the stabilized sheet are placed face-to-face between mold release coated aluminum caul plates with corner spacers which only allow very slight compression, sufficient to assure that the sheets are in good contact. The assembly is inserted into a circulating air over at about 550° F. for about 100 minutes. Upon removal and cooling, the foam structure is found to be well bonding and the uncured impregnating resin is found to be fully cured. The panel is not only rigid and capable of resisting considerable handling but has greatly improved flame resistance. The panel is installed on walls to be protected with the stabilized foam toward the direction from which flames are anticipated, with the cured impregnated sheet toward the wall.

EXAMPLE IV

A quantity of polyimide precursor, prepared according to Example I of U.S. Pat. No. 3,554,939, powder is spread on a Teflon flourocarbon resin coated glass cloth and placed in a microwave oven. The powder is heated at about 750 watts. Spontaneous foaming is continuously observed. When foam rise ends, the material is removed from the oven and trimmed to a sheet having a thickness of about 1 inch, with all rind or discontinuities removed. The sheet is placed between mold release coated glass sheets with corner blocks which permit compression to a thickness of about ¼ inch. The assembly is returned to the microwave oven and heated at 750 watts for about 20 minutes. The resulting stabilized sheet is found to have its bulk density increased from about 0.6 lb/ft3 to about 2.4 1 b/ft#. The sheets are covered lightly on one side with polyimide resin as described previously in example II and dried in a warm oven, or in the open.

Four sheets of this ¼ inch insulation are then wrapped around a 2⅜ inch outside diameter mandrel. A cylindrical sheet metal sleeve is then fitted around the assembly, compressing the foam sheets only slightly. The assembly is placed in a circulating air oven at heated at about 475° F. for about 30 minutes. Upon cooling and removal from the shaping surfaces, a well stabilized tubular insulation results. The foam tube is sliced longitudinally along its axis. The two halves are then placed around a 2⅜ inch OD plastic pipe to be protected and held in place with stainless steel clamps. The insulation is arranged with the joints at about 90° to the anticipated fire direction for maximum protection.

EXAMPLE V

A sheet of uncured rigidized open cell polyimide foam is prepared as described in copending U.S. patent application Ser. No. 111,851, filed Oct. 23, 1987. The impregnated with a polyimide coating precursor which has been dried. The sheet is formed into a circular tube having a diameter of about 8 inches. A collapsible mandrel is inserted inside the tube and a cylindrical sheet metal cover is installed over the foam. Glass fabric coated with Teflon flourocarbon resin is used as a mold release between foam and tooling. The assembly is placed in an oven and the impregnating resin is cured at a temperature of about 500° F. for about 60 minutes. A strong, rigid tube results.

A thin coating of a polyimide resin precursor mixed with ethyl alcohol is spread over the outside of the rigid tube. A layer of ¼ inch thick stabilized foam prepared as described in Example III is wrapped around the rigid tube. A cylindrical sheet metal cover is placed over the sandwich slightly compressing the outside layer. This assembly is placed in the oven where the outside layer is again stabilized and the bonding coating is cured at about 575° F. for about 60 to 90 minutes.

The resulting duct is subjected to a fire test of 15 minutes duration over a burning pool of hexane which generates 1600° flames. At the end of the test the duct is still structurally sound and the inside of the duct shows no damage. The exterior of the duct shows some evidence of scorching, but much less than occurs with the rigid internal duct when tested without the surface layer of stabilized foam.

EXAMPLE VI

A sheet of polyimide foam is prepared as described by Gagliani et al. in Example I of U.S. Pat. Re. 31,756, reissued Dec. 4, 1984. The foamed sheet is trimmed to a thickness of about 1 inch. A sheet of lightweight graphite fabric, lightly coated with a mixture of polyimide precursor and ethyl alcohol is placed over one surface of the foam sheet. The foam sandwich is placed between aluminum caul plates with corner spacers limiting compression to a thickness of about ⅓ inch. The assembly is placed in a circulating air oven and heated at a temperature of about 575° F. for about 70 minutes. Upon removal and cooling a stabilized foam sheet having the facing sheet well bonded to one surface is found. The facing sheet adds considerable strength. A second sheet of stabilized foam is prepared in the same way, but without the facing sheet.

Each stabilized foam sheet is bonded to an aluminum equipment enclosure with a high temperature epoxy adhesive. The face sheet on the first sample is arranged outward of the foam. Each sheet is exposed to 1600° for about 15 minutes. Temperatures measurements on the inside of the enclosure show little temperature rise. Both foam sheets are structurally intact after the test, although the face sheet shows greater scorching damage, apparently due to greater heat absorption and more rapid heat transfer to the foam.

While the methods and products described in the above description of preferred embodiments describe certain specific materials, conditions and configurations, these can be varied, where suitable, with similar results. For example, a variety of polyimide foam precursor materials may be used and various multi-layer configurations may be designed.

Other variations, applications and ramifications of this invention will occur to those skilled in the art upon reading this specification. Those are intended to be included within the scope of this invention, as defined in the appended claims.

We claim:

1. The method of making high efficiency flame resistant polyimide foam insulation which comprises the steps of:
   providing a uniform sheet of polyimide foam which had been foamed unconstrained;
   pressing said sheet between opposed surfaces to a thickness of from about 10 to 90 per cent of the original thickness;
   heating said sheet to a temperature of from about 400° to 650° F. for a period sufficient to stabilize the foam sheet at a uniform higher density;
   placing a polyimide precursor resin coated face sheet against at least one surface of said stabilized foam sheet;
   pressing the resulting sandwich between opposed surfaces to the final desired thickness, the foam thickness being at least about 25 per cent of the original sheet thickness;
   heating the resulting assembly to a temperature of from about 400° to 650° F. for a period sufficient to cure said coating resin; and
   cooling the now well bonded flame resistant insulation panel to room temperature.

2. The method according to claim 1 further including the steps of producing the original uniform low density foam sheet by:
providing a polyimide foam precursor in powder form;
substantially uniformly spreading said powder over a mold release covered surface;
heating the powder to its foaming temperature for a period sufficient to permit substantially complete and unrestrained foaming;
trimming the resulting uneven-surfaced low density foam to produce a sheet having the desired dimensions and no remaining rind or other density non-uniformities.

3. The method according to claim 1 wherein said face sheet is a fiber material in a woven or watt form.

4. The method according to claim 1 whereby adhesion of said at least one face sheet to said foam sheet is improved by mixing a polyimide resin precursor with a solvent which does not attack said foam, coating one surface of each face sheet lightly with said mixture and placing the coated surface of said face sheet against said foam.

5. The method of making high efficiency flame resistant polyimide foam insulation which comprises the steps of:
spreading a layer of a powdered polyimide foam precursor on a surface;
heating said powder to its foaming temperature for a period sufficient to permit substantially complete and unconstrained foaming;
trimming the resulting uneven foam sheet to the desired sheet configuration, removing substantially all rind and other density non-uniformities;
pressing said sheet between opposed surfaces to a thickness of from about 10 to 90 per cent of the original thickness;
heating said sheet to a temperature of from about 400° to 650° F. for from about 10 to 30 minutes; and
whereby stabilized, higher density, uniform insulation having improved flame resistance results.

6. The method according to claim 5 including the further steps of:
mixing a polyimide resin precursor with a suitable solvent therefor;
lightly coating at least one face sheet with said mixture;
drying the coated surfaces;
placing the coated surface of said at least one face sheet against at least one face of the stabilized foam sheet;
heating the resulting sandwich to a temperature sufficient to cure said resin precursor; and
whereby said face sheet is bonded to said stabilized foam sheet.

7. The method according to claim 6 whereby said face sheet is pressed against said stabilized foam sheet during said heating, said pressure being insufficient to compress said foam sheet to less than about 25 per cent of the original trimmed foam sheet thickness.

8. The method according to claim 6 wherein said opposing surfaces are mold release coated caul plates and further including placing spacer blocks between said caul plates to limit compression to the desired degree.

9. The method according to claim 6 further including the steps of:
providing an uncured sheet of open cell polyimide foam uniformly impregnated with a liquid polyimide resin precursor;
placing said uncured sheet against said stabilized foam sheet;
heating the resulting assembly to the curing temperature of said liquid polyimide resin precursor for a time sufficient to produce complete cure; and
whereby a high efficiency rigid insulation panel is produced having a highly flame resistant stabilized foam face.

10. The method of making high efficiency flame resistant rigid polyimide foam insulation which comprises the steps of:
providing a substantially uniform sheet of polyimide foam which had been foamed unconstrained;
pressing said sheet between opposed surfaces to a thickness of from about 25 to 40 per cent of the original thickness;
heating said sheet to a temperature of from about 425° to 600° F. for a period sufficient to stabilize the foam at a uniform higher density;
providing an uncured sheet of open cell polyimide foam which has been uniformly impregnated with a liquid polyimide resin precursor and dried;
placing said uncured sheet against said stabilized foam sheet to form a sandwich;
heating the sandwich to the curing temperature of said impregnating polyimide resin precursor for a time sufficient to produce substantially complete cure; and
whereby a high efficiency rigid insulation panel having a highly flame resistant face is produced.

11. The method according to claim 10 further including placing a face sheet against the free surface of said uncured sheet of said sandwich prior to said heating step whereby said face sheet is bonded to said sandwich during said heating step.

12. The method according to claim 10 further including the steps of:
providing a face sheet;
coating one surface of said face sheet with a liquid polyimide resin precursor;
placing said coated surface against the free surface of said stabilized foam in said sandwich prior to said heating step; and
whereby said coating resin precursor is cured during said heating step to bond said face sheet to said panel.

13. The method of making high efficiency flame resistant polyimide foam insulation in tubular form which comprises the steps of:
providing at least one thin uniform sheet of polyimide foam which had been foamed unstrained;
pressing said sheets between opposed surfaces to thicknesses of from about 25 to 40 per cent of the original thickness;
heating said sheets to a temperature of from about 400° to 650° F. for a period sufficient to stabilize the foam sheets;
wrapping said at least one sheet at least once around a mandrel;
surrounding said wrapped mandrel with a cover in contact with said sheets;
heating the resulting assembly to a temperature of from about 400° to 650° F. for from about 60 to 90 minutes; and removing the resulting stabilized tube from said mandrel and cover.

14. The method of making a rigid tubular duct having high insulation efficiency and a highly flame resistant outer surface which comprises the steps of:

providing an uncured sheet of open cell polyimide foam uniformly impregnated with a liquid polyimide resin precursor;

wrapping said uncured sheet at least once around a collapsible mandrel;

covering said uncured sheet with a cover having an internal configuration corresponding to said mandrel shape and spaced uniformly therefrom;

heating the assembly at a temperature of from about 400° to 650° F. for a period sufficient to cure said impregnating resin;

whereby a tubular rigid foam duct is produced;

providing a substantially uniform low density sheet of polyimide foam which had been foamed unconstrained;

pressing said low density sheet between opposed surfaces to a thickness of from about 25 to 40 per cent of its original thickness;

heating said low density sheet at a temperature of from about 400° to 650° F. for a period sufficient to stabilize the foam at higher density;

applying a coating of liquid polyimide resin precursor to one surface of the stabilized foam sheet;

drying the coated surface;

wrapping said stabilized foam sheet around said rigid foam duct with the coated surface in contact with said duct;

holding said stabilized foam sheet in place;

heating the resulting assembly to a temperature of from about 400° to 650° F. for a period sufficient to cure said coating polyimide precursor; and whereby a high efficiency rigid insulated duct having a highly flame resistant outer face is produced.

15. A high efficiency flame resistant polyimide foam insulation which comprises a compressed stabilized sheet of polyimide foam having a thickness of from about 10 to 90 per cent of the thickness of the original foam sheet which had been foamed unconstrained and at least one face sheet bonded to at least one face of said stabilized sheet.

16. The insulation according to claim 15 further including a rigid sheet of open cell polyimide foam bonded to one surface of said stabilized sheet, said rigid foam sheet having a coating of cured polyimide resin coating the interstices thereof whereby the stabilized foam sheet provides superior flame resistance and the rigid sheet adds rigidity to the sandwich.

17. The insulation according to claim 15 further including at least one face sheet bonded to at least one face of said sandwich.

18. The insulation according to claim 16 wherein said sandwich is in the form of a tubular duct with said rigid foam sheet on the inside and said stabilized foam sheet on the outside.

19. The insulation according to claim 18 further including a face sheet bonded to the outside of said duct.

* * * * *